(No Model.)
W. C. STETSON.
APPARATUS FOR SORTING LUMBER.
No. 299,694. Patented June 3, 1884.
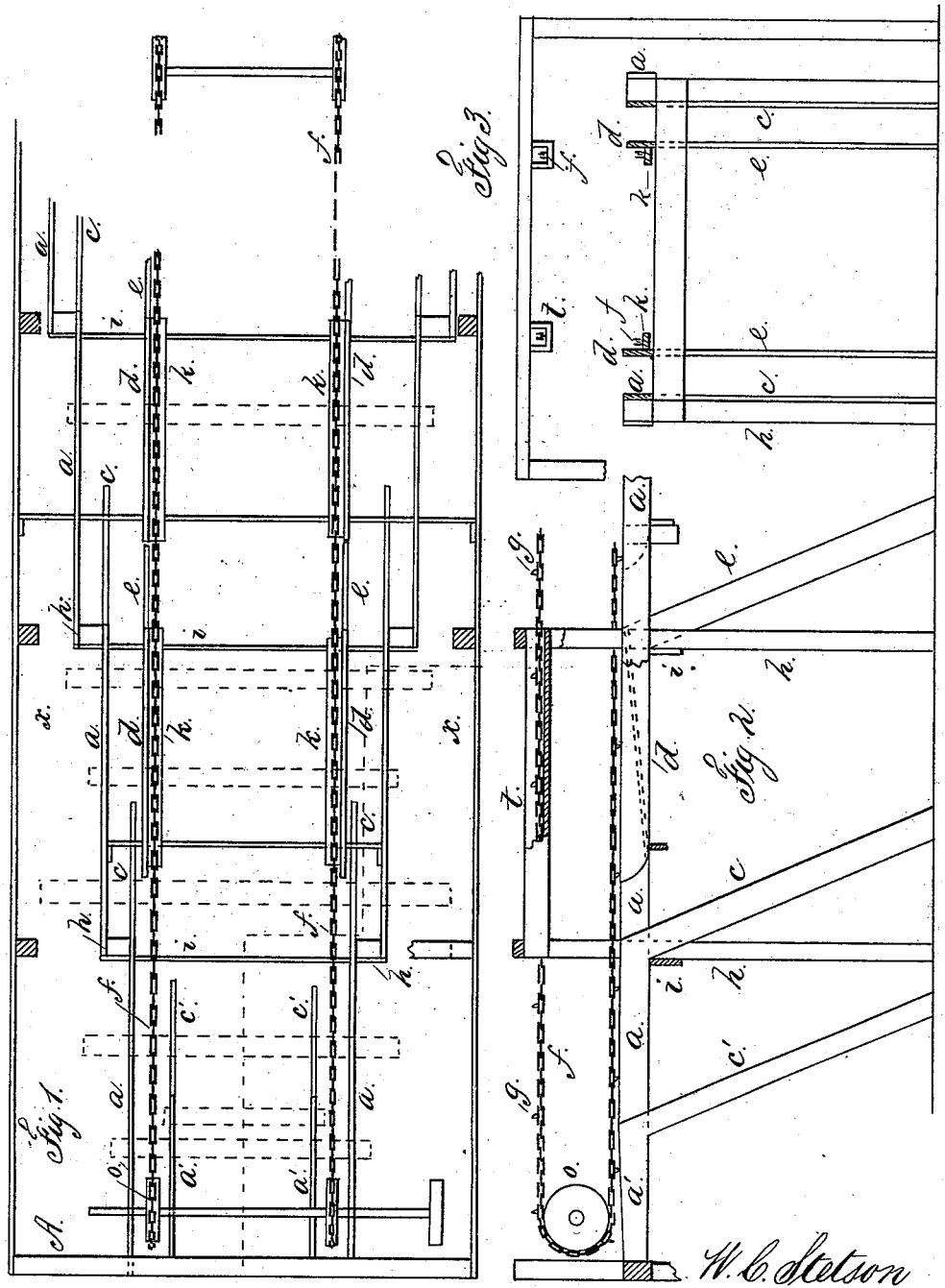

UNITED STATES PATENT OFFICE.

WARREN C. STETSON, OF MINNEAPOLIS, MINNESOTA.

APPARATUS FOR SORTING LUMBER.

SPECIFICATION forming part of Letters Patent No. 299,694, dated June 3, 1884.

Application filed August 24, 1883. (No model.)

*To all whom it may concern:*

Be it known that I, WARREN C. STETSON, of Minneapolis, in the county of Hennepin and State of Minnesota, have invented an Improved Apparatus for Sorting Lumber, of which the following is a specification.

In saw-mills the lumber from gang-saws goes directly to the trimming-machine, where it is sawed to standard lengths, then discharged, and afterward sorted or separated according to length, the sorting having been generally done by hand.

The object of my invention is to sort the lumber automatically after it leaves the trimmer and lay it in piles according to length, so as to save hand-labor and facilitate loading of the lumber upon trucks. To that end I make use of endless chains, combined with graduated ways and inclined planes, by which the lumber is all carried forward, and that of each length released in succession, as hereinafter described and claimed.

Reference is to be had to the accompanying drawings, in which similar letters of reference indicate corresponding parts.

In the drawings, Figure 1 is a sectional plan view of the apparatus. Fig. 2 is a sectional side elevation. Fig. 3 is a cross-section on line $x$ $x$ of Fig. 1, and Fig. 4 is a detail view of the chain.

The end A of the apparatus is to be placed next to a lumber-trimming machine of any ordinary character, having saws arranged to cut the boards in lengths from eight up to twenty-four feet, so as to receive the lumber sidewise upon the parallel rails or ways $a$ $a$. These rails $a$ are supported upon posts $h$ $h$ and cross-pieces $i$, and are to be of any required length. At their outer ends are inclined ways $c$, extending to the ground where the lumber is to be piled, and the posts $h$ at this point are set wider apart—that is, a foot out at each side—so that the next parallel rails $a$ are adapted to carry lumber two feet longer. This arrangement of widening at each section is continued to the end of the apparatus, the length of each section being according to the space wanted for piling the lumber. From the second section and after there are inner rails or ways, $d$, commencing at each section in front of the inclined ways $c$, and terminating at their forward ends in inclined ways $e$. These additional ways $d$ $e$ are to give support to boards between the ends, as is required with long lumber, to keep it up to the chains. At the end A of the apparatus is a cross-shaft, which is to be rotated by suitable power, and upon the shaft, between rails $a$, are chain-wheels $o$, carrying endless chains $f$ $f$, that extend around similar chain-wheels at the outer end of the apparatus. The lower portions of the chains run level, or nearly so, with the upper surface of rails $a$, and at intervals the chains are fitted with lugs or hooks $g$, projecting outward. The upper portions of the chains may pass, as shown, through troughs $t$, that prevent sagging, and for supporting the lower chains there are boards $k$, fastened to the ways $d$. The lumber is to be placed upon the apparatus by hand, or pass thereon automatically from the trimming-machine, and as soon as it comes beneath the chains it is carried or pushed forward on ways $a$ by the hooks $g$. The shortest boards, when they reach the ends of the narrowest ways $a$, pass down the inclines $c$, while longer boards continue to the rails $a$ $d$ of the next section, and are discharged in succession as the ways terminate. The space between each section thus becomes a receptacle for lumber of certain length, so that the material can there be graded as to quality and loaded upon trucks conveniently. The rails $a$ of the first section may be inclined beneath the chain-wheels $o$, so as to give space for the hooks $g$ to take hold upon two or more boards in a pile; or these first rails may be hinged and kept up by weights, so that the hooks may grasp a single board, and when two or more boards or thick stuff enters the rails will move down to give the space required between the rails and chain.

In order to utilize space, and also avoid placing the chains so closely, I provide the rails $a'$ $a'$ and inclines $c'$ in the first section, which allow the short material to pass down, such material being moved forward by longer lumber behind it.

The details of construction may be varied from what is described without departing from my invention. The essential features are the ways and inclines with the chains moving above the lumber, so that as soon as the proper place is reached the lumber is released at once, and no other devices are required to carry it off.

I am aware it is not new to move lumber by endless chains.

Having thus described my invention, what I claim as new, and desire to secure by Letters Patent, is—

1. The apparatus for sorting lumber, consisting of a series of rails or ways in sections successively wider one than another, inclines at the ends of the rails, and an endless traveling chain above the ways, and fitted with lugs or hooks for carrying the material forward, substantially as shown and described.

2. In lumber-sorters, the combination of the rails $a$, placed in sections widening successively, and the endless traveling chains $f$, provided with hooks or lugs, the chains being fitted above the rails and operated by suitable mechanism, so as to act on lumber placed on the rails, substantially as described.

WARREN C. STETSON.

Witnesses:
E. M. BUNYAN,
ALEX. W. STOW.